C. C. LAYMOND.
POWER REGULATING DEVICE FOR BRAKES.
APPLICATION FILED APR. 17, 1915.
1,181,775.  Patented May 2, 1916.
Fig. 1.
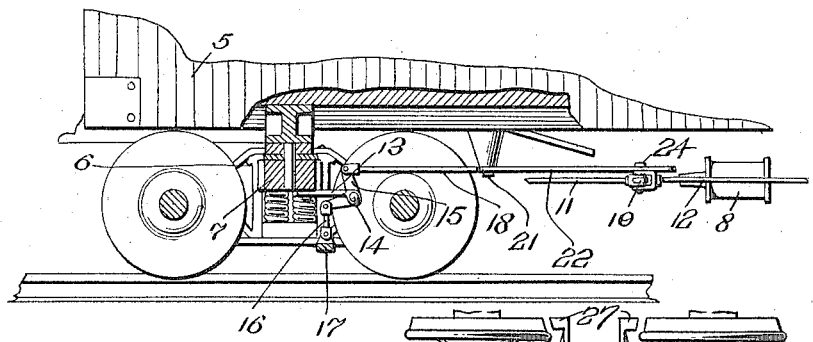
Fig. 2.  Fig. 4.
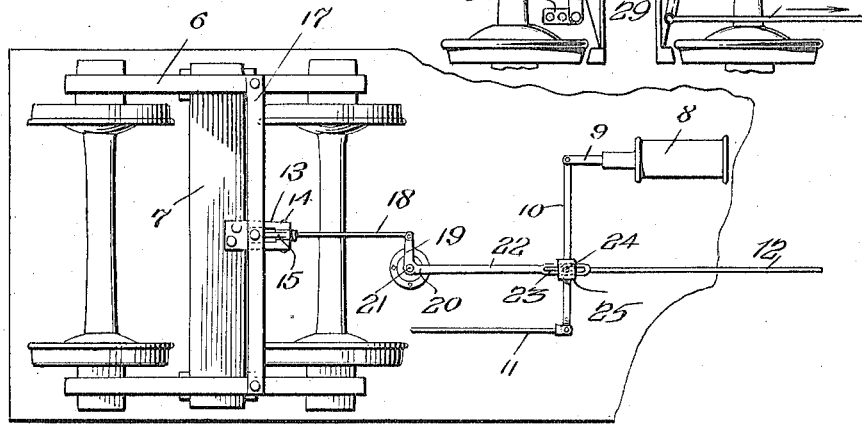
Fig. 3.
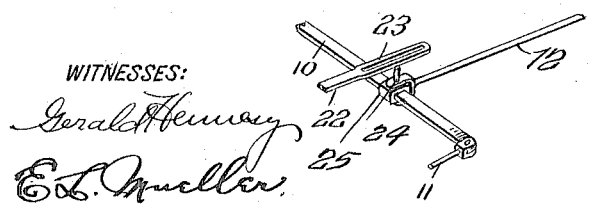
WITNESSES:
INVENTOR
CLINTON C. LAYMOND,
ATTORNEYS

UNITED STATES PATENT OFFICE.

CLINTON C. LAYMOND, OF MARION, OHIO.

POWER-REGULATING DEVICE FOR BRAKES.

1,181,775.   Specification of Letters Patent.   Patented May 2, 1916.

Application filed April 17, 1915.   Serial No. 22,045.

*To all whom it may concern:*

Be it known that I, CLINTON C. LAYMOND, a citizen of the United States, and a resident of Marion, in the county of Marion and State of Ohio, have invented an Improvement in Power-Regulating Devices for Brakes, of which the following is a specification.

The present invention relates to braking connections for railway and other vehicles and more particularly to a construction for automatically increasing and decreasing the amount of power applied to the brakes themselves in conformity with the load in the car.

The primary object of the invention is the provision of a simple and efficient means consisting of mechanical connections between the brake cylinder of the air braking system and the brake shoes, said connections being operated by the bolsters of the car which are affected by the variations in the load, to increase or decrease the power applied to the car wheels through the medium of the brake shoes.

The inventive idea involved is capable of receiving a variety of mechanical expressions, one of which, for the purpose of illustrating the invention, is shown in the accompanying drawing, but it is to be expressly understood that the construction shown in the drawing is used merely to facilitate the description of the invention as a whole and not to define the limits thereof, reference being had to the appended claims for this purpose.

In the drawings: Figure 1 is a fragmentary side elevation of a railway car showing the truck and bolster in section with the invention applied thereto. Fig. 2 is a bottom plan view, with the brake rigging removed for purposes of better illustration. Fig. 3 is a perspective view of a detail. Fig. 4 is a bottom plan view of the brake rigging used in connection with the invention.

Referring more particularly to the accompanying drawing in which like reference characters designate similar parts, 5 indicates a vehicle of any ordinary construction and having the truck 6 and the bolster 7 applied thereto in the usual manner, the latter being of any conventional construction now in common usage. The brake cylinder of the air braking system is indicated by 8 and is connected to the brake shoes and operates same through the medium of the piston rod 9, oscillating lever 10 and brake shoe rods 11 and 12, the former being pivoted to the lever 10 at one end thereof, and the latter being connected to said lever intermediate its ends.

Secured to and extending horizontally from a movable portion of the bolster 7 is a support 13 which has pivoted thereto at 14 the bell crank lever 15. One arm of the bell crank lever 15 is connected to a stationary upright 16 which is connected to a transverse brace 17 secured to the truck 6 of the vehicle. A connecting rod 18 is pivoted at one end to the other arm of the bell crank lever 15 and is similarly connected to the short arm 19 of another bell crank lever 20, the latter being supported at 21 from the bottom of the car by a suitable pivot. The long arm 22, of bell crank lever 20, is provided at its free end with an elongated slot 23 which engages a pivot pin 24 carried by the sliding collar 25 mounted on the oscillating lever 10. One end of the rod 12 is connected to the collar 25, as clearly illustrated in Fig. 3.

The brake rigging used in connection with the invention is illustrated in Fig. 4 and one of said riggings is attached to each of the rods 11 and 12. The riggings are of identical construction so that a description of the operation of one will suffice for both. The rigging comprises oppositely disposed brake beams 25' and 26 carrying the brake shoes 27 on the ends thereof adapted for engagement with the wheels of the car. A stationary support 28 is suitably secured to a part of the bolster and has one end of a lever 29 secured thereto, said lever being pivoted intermediate its ends at 30 to the brake beam 25'. A similar lever 31 is pivoted intermediate its ends to the beam 26, one end of said lever being connected to the operating rod 11 and the other end thereof having secured thereto one end of the connecting member 32 the other end of which is secured to the other end of the lever 29. It will be apparent from this construction that when the rod 11 is operated in the direction of the arrow, shown in Fig. 4, the lever 31 will first be oscillated about its pivot causing a similar movement of the lever 29 through the medium of the connecting member 32. This movement will cause the brake shoes of the beam 25' to engage the adjacent wheels and upon this engagement the oscillation of the lever 31 will cease and further pull upon the rod 11 will cause the brake shoes of the beam 26 to engage their adjacent wheels.

It will be seen from the foregoing description that when the triple valve in the braking system is operated the piston in the cylinder 8 will be reciprocated and the piston rod 9 which is connected to one end of the oscillating lever 10 will operate said lever to cause the engagement of the brake shoes with their corresponding wheels by reason of the connection of the rods 11 and 12 with said lever. The first movement of the lever 10 will exert a pull upon the rod 12 and operate the brake rigging connected thereto to bring the brake shoes in engagement with the wheels. During this pull on the rod 12 the pin 24 will slide in slot 23 toward the pivot 21 in Fig. 2 until the brake shoes have engaged the wheel, the lever 10 swinging about the connection thereof with the rod 11. As soon as the brake rigging connected to the rod 12 has been operated as described, a fulcrum for the lever 10 will be made about the pivot 24 whereupon a pull will be exerted upon the rod 11 to operate the brake rigging attached thereto. It is to be understood that the slot 23 in the arm 22 is of sufficient length to permit of enough movement of the arm 12 so that the brake shoes connected thereto will securely engage the wheels. The air pressure in the cylinder 8 after the brake shoes have been operated as just described, will only bring said shoes into tighter engagement with the wheels.

Under normal conditions, and with no great load in the vehicle, the amount of power applied to the brake shoes through the connections, just described and shown in Fig. 2, will be sufficient to bring the car to a stop; but with a heavy load it is necessary that more power should be applied to the brake shoes in order to accomplish the purpose desired. Therefore, the invention provides for shifting the pivot pin 24 so as to be moved nearer to the end of the lever 10 to which the brake shoe rod 11 is connected so that said lever will have a greater leverage and by reason of this fact, with no increase of pressure in the cylinder, a greater amount of power will be applied to the brake shoe. With a greater load in the vehicle, the movable portion of the bolster 7 will be lowered by reason of said load and the support 13 which is connected to the movable portion of said bolster will in turn cause a downward movement of the pivot 14. This latter movement will transmit a rearward thrust to the rod 18 which will cause the bell crank lever 20 to swing about its pivot 21 and the arm 22 of said lever will move the sliding collar 25 along the oscillating lever 10 toward the brake shoe rod 11, the pivot pin 24, during such adjustment moving toward the right end of the slot 23. It will be apparent that the degree of movement of the collar 25 will depend on the amount of load in the car and that such load automatically increases and decreases the amount of power sufficient to bring the car to a stop.

I claim:—

1. In a vehicle, the combination of an air braking system including brake shoe rods, a connection between the brake cylinder of the system and one end of one of said rods, a slidable element mounted upon said connection, a shiftable pivot for said connection carried by said element and secured to one end of the other brake shoe rod, and automatically operated means including an oscillating lever engaging said pivot for shifting the same.

2. In a vehicle, the combination of an air braking system, a bolster for the vehicle, a bell crank lever pivoted at one end to a stationary part of the bolster and intermediate its ends to a movable part thereof, a second bell crank lever pivoted to the vehicle and having one of its arms connected to the first-named bell crank lever, the other arm of said second lever having a slot therein, an oscillating lever connected to the brake cylinder of the system and the brake-shoes, and a sliding collar on said oscillating lever and having a pivot adapted for engagement with the slot in said second-named bell crank lever whereby said collar is shifted when the load in the vehicle is varied.

3. In a vehicle, the combination of an air braking system including a pair of brake-shoe rods, a bolster for the vehicle, a bell crank lever pivoted to the vehicle and having one of its arms connected to said bolster, the other arm of said bell crank lever being provided with a slot, an oscillating connection between the brake cylinder of the system and one of said brake-shoe rods, and a collar slidable on said oscillating connection and having a pivot adapted for engagement with the slot in said bell crank lever, the other brake-shoe rod being connected to said collar.

CLINTON C. LAYMOND.

Copies of this patent may be obtained for five cents each, by addressing the "Commissioner of Patents, Washington, D. C."